(12) United States Patent
Suryanaryana et al.

(10) Patent No.: US 11,474,234 B2
(45) Date of Patent: Oct. 18, 2022

(54) DEVICE AND METHOD FOR ESTIMATING DISTANCE BASED ON OBJECT DETECTION

(71) Applicant: MANDO CORPORATION, Pyeongtaek-si (KR)

(72) Inventors: Kallakuri Sankalp Suryanaryana, Pyeongtaek-si (KR); Jitesh Kumar Singh, Pyeongtaek-si (KR)

(73) Assignee: HL Klemove Corp., Incheon (KR)

( * ) Notice: Subject to any disclaimer, the term of this patent is extended or adjusted under 35 U.S.C. 154(b) by 268 days.

(21) Appl. No.: 16/359,401

(22) Filed: Mar. 20, 2019

(65) Prior Publication Data
US 2019/0293782 A1    Sep. 26, 2019

(30) Foreign Application Priority Data

Mar. 20, 2018 (KR) .................. 10-2018-0032147

(51) Int. Cl.
| | | |
|---|---|---|
| *G01S 13/86* | (2006.01) | |
| *G01S 17/86* | (2020.01) | |
| *G01S 7/41* | (2006.01) | |
| *G01S 13/931* | (2020.01) | |

(52) U.S. Cl.
CPC .............. *G01S 13/867* (2013.01); *G01S 7/41* (2013.01); *G01S 13/931* (2013.01); *G01S 17/86* (2020.01); *G01S 2013/9323* (2020.01)

(58) Field of Classification Search
CPC ........ G01S 13/867; G01S 7/41; G01S 13/931; G01S 2013/9323; G01S 17/86
See application file for complete search history.

(56) References Cited

U.S. PATENT DOCUMENTS

| | | | | |
|---|---|---|---|---|
| 6,888,447 B2 * | 5/2005 | Hori | ............... | G01S 13/867 340/435 |
| 7,706,978 B2 * | 4/2010 | Schiffmann | ............... | G01S 13/931 701/301 |
| 7,710,310 B2 * | 5/2010 | Huizing | ............... | G01S 13/867 342/52 |
| 8,705,797 B2 * | 4/2014 | Zeng | ............... | G06T 1/0007 382/103 |

(Continued)

FOREIGN PATENT DOCUMENTS

KR    10-2016-0140303 A    12/2016

*Primary Examiner* — Matthew M Barker
(74) *Attorney, Agent, or Firm* — Morgan, Lewis & Bockius LLP (57) ABSTRACT

A device for estimating a distance based on object detection and a method thereof are provided. The device for estimating a distance based on object detection according to an embodiment of the present disclosure includes a fusion sensor including a first sensor configured to detect positions of a plurality of objects in front of a host vehicle and a second sensor configured to capture a front image of the host vehicle, and a controller communicatively connected to the fusion sensor and configured to recognize all radar tracks corresponding to distances detected by the first sensor and all vision tracks corresponding to distances detected by the second sensor, assign adjacent vision tracks for each of the radar tracks to one cluster, and correct distances of all the vision tracks assigned to the corresponding cluster based on the closest vision track from the radar track for each cluster.

15 Claims, 10 Drawing Sheets

(56) References Cited

U.S. PATENT DOCUMENTS

| | | | | |
|---|---|---|---|---|
| 9,041,588 B2* | 5/2015 | Yasugi | ............... | G06K 9/00214 |
| | | | | 342/52 |
| 9,797,734 B2* | 10/2017 | Mizutani | ............... | G01S 13/726 |
| 10,338,211 B2* | 7/2019 | Shirai | ..................... | G06T 7/593 |
| 10,565,468 B2* | 2/2020 | Schiffmann | ............. | G01S 13/42 |
| 2013/0335259 A1* | 12/2013 | Yasugi | .................... | G08G 1/04 |
| | | | | 342/52 |
| 2019/0103663 A1* | 4/2019 | Ichinose | ................ | H01Q 13/10 |

\* cited by examiner

DEVICE AND METHOD FOR ESTIMATING DISTANCE BASED ON OBJECT DETECTION

CROSS-REFERENCE TO RELATED APPLICATION

This application claims priority to and the benefit of Korean Patent Application No. 2018-0032147, filed on Mar. 20, 2018, the disclosure of which is incorporated herein by reference in its entirety.

BACKGROUND

1. Field of the Disclosure

The present disclosure relates to a device for estimating a distance based on object detection and a method thereof, and more particularly, to a device for estimating a distance based on object detection using a fusion sensor and a method thereof.

2. Discussion of Related Art

Recently, various forms of driver assistance systems based on an imaging technique are being developed. In particular, in order to support safe driving in autonomous driving as well as in a situation in which a driver's concentration level is decreased, front objects of a vehicle and distances to the objects are used.

To this end, image sensors such as cameras are widely used as sensors for monitoring the front, and a method of using radar sensor is additionally proposed. Further, a method of detecting objects using a plurality of sensors whose detection regions overlap each other has been proposed.

Here, if the object is a pedestrian, a distance between the pedestrian and a host vehicle should be accurately calculated to accurately calculate the time until the vehicle collides with the pedestrian.

However, in the above-described method, distance calculation by the image sensor has a large error with an actual distance and distance calculation by the radar sensor is difficult to distinguish and recognize the pedestrian, and thus, there is a demand for a method of compensating for such drawbacks and accurately calculating the distance.

PRIOR-ART DOCUMENTS

Patent Documents (Patent Document 1) KR2016-0140303A

SUMMARY

In order to solve the problems of the related art as described above, one embodiment of the present disclosure is directed to providing a device for estimating a distance based on object detection, which is capable of accurately estimating distances by correcting the distances according to a ratio between distances obtained from each sensor using a fusion sensor, and a method thereof.

According to an aspect of the present disclosure, there is provided a device for estimating a distance based on object detection including a fusion sensor having a first sensor configured to detect positions of a plurality of objects in front of a host vehicle and a second sensor configured to capture a front image of the host vehicle, and a controller communicatively connected to the fusion sensor and configured to recognize all radar tracks corresponding to distances detected by the first sensor and all vision tracks corresponding to distances detected by the second sensor, assign adjacent proximity vision tracks for each of the radar tracks to one cluster, and correct distances of all the vision tracks assigned to the corresponding cluster based on the closest vision track from the radar track for each cluster.

The first sensor may be a radar sensor or a lidar sensor, and the second sensor may be an image sensor.

The controller may be configured to recognize the closest radar track for each of the vision tracks and assign each vision track to the cluster having the closest radar track The controller may be configured to recognize and tag the closest vision track from the radar track for each cluster, determine a ratio of a distance from the host vehicle to the radar track to a distance from the host vehicle to the closest vision track for each cluster, and apply the ratio to all the vision tracks assigned to the corresponding cluster.

The controller may be configured to determine the number of the clusters and determine the number of entities representing the objects in each cluster.

According to another aspect of the present disclosure, there is provided a method of estimating a distance based on object detection including: recognizing all radar tracks corresponding to distances detected by a first sensor and all vision tracks corresponding to distances detected by a second sensor based on data detected by a fusion sensor including the first sensor and the second sensor, the first sensor being configured to detect positions of a plurality of objects in front of a host vehicle, and the second sensor being configured to capture a front image of the host vehicle; assigning adjacent vision tracks for each of the radar tracks to one cluster using a controller communicatively connected to the fusion sensor; and correcting distances of all vision tracks assigned to the corresponding cluster based on the closest vision track from the radar track using the controller for each cluster.

The first sensor may be a radar sensor or a lidar sensor, and the second sensor may be an image sensor The assigning operation may include recognizing the closest radar track for each of the vision tracks and assigning each vision track to the cluster having the closest radar track.

The correcting operation may include recognizing and tagging the closest vision track from the radar track for each cluster, determining a ratio of a distance from the host vehicle to the radar track to a distance from the host vehicle to the closest vision track, and applying the ratio to all the vision tracks assigned to the corresponding cluster.

The method of estimating a distance based on object detection may further include, after the assigning the adjacent vision tracks, determining the number of the clusters; and determining the number of entities representing objects in each cluster.

BRIEF DESCRIPTION OF THE DRAWINGS

The above and other objects, features, and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present disclosure will be described in detail below with reference to the accompanying drawings so that those skilled in the art may easily embody the disclosure. The present disclosure may be embodied in several different forms and is not limited to embodiments that will be described below. In the drawings, for clarity, irrelevant portions to descriptions are omitted, and the same reference numerals throughout the specification are used for the same or similar components or elements.

Figure 1:
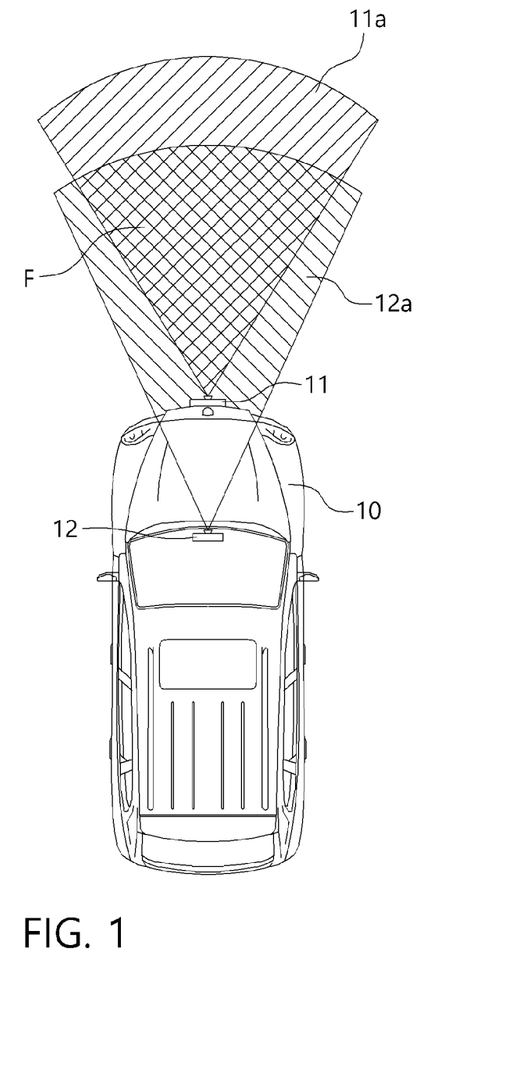
FIG. 1 is a view illustrating a vehicle to which an object detection based distance estimating device according to an embodiment of the present disclosure is applied.

Hereinafter, an object detection based distance estimating device according to an embodiment of the present disclosure will be described in more detail with reference to the drawings. FIG. 1 is a view illustrating a vehicle to which an object detection based distance estimating device according to an embodiment of the present disclosure is applied.

Referring to FIG. 1, a vehicle 10 to which the object detection based distance estimating device according to one embodiment of the present disclosure is applied includes a fusion sensor.

The present disclosure is useful when using the fusion sensor including different types of sensors. Here, the different types of sensors may provide different numbers of detections and may also provide different distance information from a host vehicle to objects. For example, the fusion sensor may include a first sensor 11 and a second sensor 12.

Here, the first sensor 11 may be configured to detect positions of a plurality of objects in front of the host vehicle. The second sensor 12 may be configured to capture front images of the host vehicle. For example, the first sensor 11 may be a radar sensor or a lidar sensor. The second sensor 12 may be an image sensor such as a camera. Here, the first sensor 11 may be excellent in detection of longitudinal distances, and the second sensor 12 may be excellent in detection of lateral distances.

The present disclosure is for estimating accurate distances by correcting the distances to be estimated using distances obtained by the different types of sensors. Here, the accurate distance between the object and the host vehicle is necessary to accurately calculate the time until the vehicle collides with the object.

The first sensor 11 and the second sensor 12 may be mounted toward the front of the vehicle 10. Here, the first sensor 11, such as a radar sensor or a lidar sensor, may be provided on a front bumper of the vehicle 10, and the second sensor 12 such as a camera or the like may be mounted under a rearview mirror provided in an interior of the vehicle 10.

Here, a region 11a in which the first sensor 11 may detect the objects and a region 12a in which the second sensor 12 may detect the objects have an overlapping region F at centers thereof. In such an overlapping region F, the present disclosure may accurately select distances from distances estimated from the first sensor 11 or distances estimated from the second sensor 12 according to situations.

Figure 2:
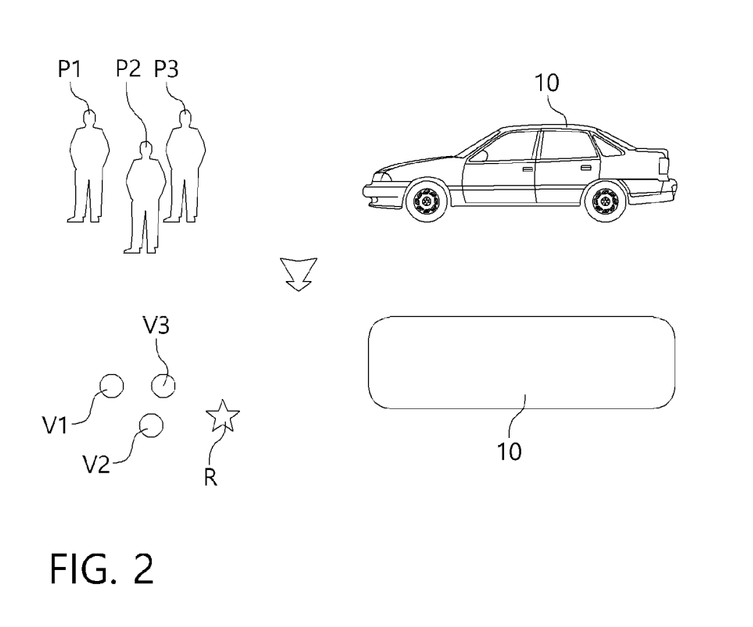
FIG. 2 is a view illustrating an example of detection positions by a first sensor and a second sensor of FIG. 1.

FIG. 2 is a view illustrating an example of detection positions by the first sensor and the second sensor of FIG. 1.

When a plurality of pedestrians P1 to P3 move in groups in the front of the vehicle 10, a distance to each group may be measured by the first sensor 11 using the closest portion of each group from the vehicle 10. Further, a distance from the vehicle 10 to each of the pedestrians P1 to P3 may be detected through images obtained from the second sensor 12. Here, the distances detected by the first sensor 11 may be represented by radar tracks, and the distances detected by the second sensor 12 may be represented by vision tracks.

Here, the pedestrian P1 to the pedestrian P3 may be positioned at distances not equal to each other from the vehicle 10. For example, the pedestrian P1 may be positioned farthest from the vehicle 10, the pedestrian P3 may be positioned closest to the vehicle 10, and the pedestrian P2 may be positioned between the pedestrian P1 and the pedestrian P3.

This situation may be represented by vision tracks V1 to V3 and a radar track R as shown in the lower part of FIG. 2.

Figure 3:
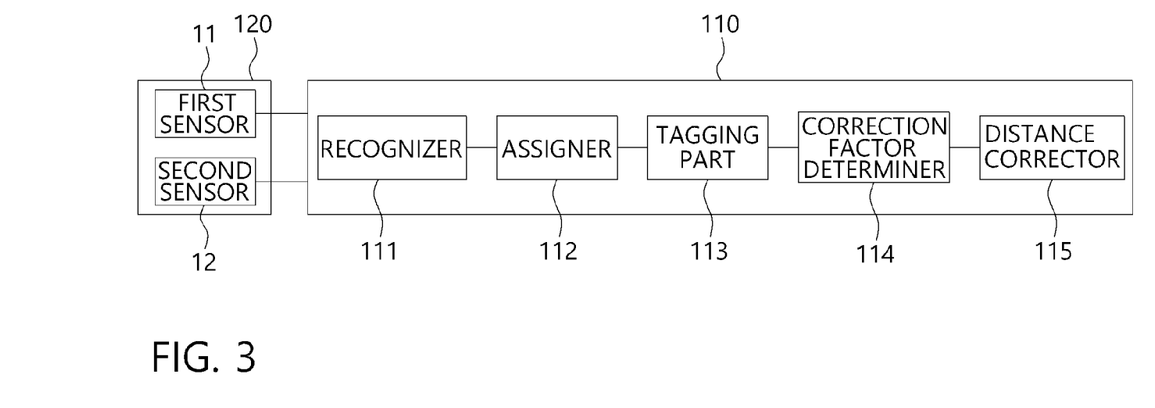
FIG. 3 is a block diagram illustrating the object detection based distance estimating device according to the embodiment of the present disclosure.

FIG. 3 is a block diagram illustrating the object detection based distance estimating device according to the embodiment of the present disclosure.

An object detection based distance estimating device 100 includes a controller 110 and a fusion sensor 120. Here, the controller 110 is communicatively connected to the fusion sensor 120 and may include a recognizer 111, an assigner 112, a tagging part 113, a correction factor determiner 114, and a distance corrector 115. Further, the fusion sensor 120 may include the first sensor 11 and the second sensor 12 as described above.

The recognizer 111 may recognize all the radar tracks corresponding to the distances detected by the first sensor 11 and all the vision tracks corresponding to the distances detected by the second sensor 12. Here, the distances measured by the first sensor 11 may be represented by the radar track as shown in FIG. 1. The distance measured from the vehicle 10 for each of the pedestrians may be represented by the vision track.

The assigner 112 may assign adjacent vision tracks for each radar track to one cluster. Here, one cluster may be assigned for one radar track.

More particularly, the assigner 112 may recognize the closest radar track to each vision track. This is to distinguish the pedestrian that exists at a position actually close to the vehicle as the distance measured by the first sensor 11 is substantially more accurate than the distance measured by the second sensor 12 for the longitudinal distance from the vehicle 10.

Further, the assigner 112 may assign each vision track to a cluster having the closest radar track to each vision track. Thus, a group of pedestrians may be assigned to one cluster.

As described above, the assigner 112 may recognize the group of the pedestrians composed of a plurality of pedestrians by assigning the adjacent vision tracks for each radar track to one cluster.

The tagging part 113 may determine the number of clusters and the number of entities to repeat calculations for each of entities representing objects for each cluster.

For example, the tagging part 113 may determine the number of clusters including the vision track and the radar track. The tagging part 113 may also determine the number of entities representing the objects in each cluster. Here, the objects existing in each cluster may be the pedestrians, which may correspond to the vision tracks. Thus, the number of entities may be the number of vision tracks included in the corresponding cluster.

Further, the tagging part 113 may recognize and tag the closest vision track from the radar track for each cluster. That is, the tagging part 113 may recognize the vision track closest to the radar track among the vision tracks in the cluster, and add a tag to the recognized vision track.

The correction factor determiner 114 may determine a ratio of the distance from the host vehicle to the radar track to the distance from the host vehicle to the closest vision track as a correction factor for each cluster. Here, the correction factor may be for correcting the distance of the vision track.

The distance corrector 115 may correct the distances of all the vision tracks assigned to the corresponding cluster based on the closest vision track from the radar track for each cluster. Here, the distance corrector 115 may apply the ratio determined as the correction factor to all the vision tracks assigned to the corresponding cluster for each cluster.

Thus, the distance between the vehicle 10 and the pedestrian may be accurately estimated by correcting the distance of the vision track corresponding to the pedestrian.

Due to such a configuration, the object detection based distance estimating device 100 according to the embodiment of the present disclosure may accurately estimate the distance, so that the time until the vehicle collides with the pedestrian may be accurately predicted.

Figure 4:
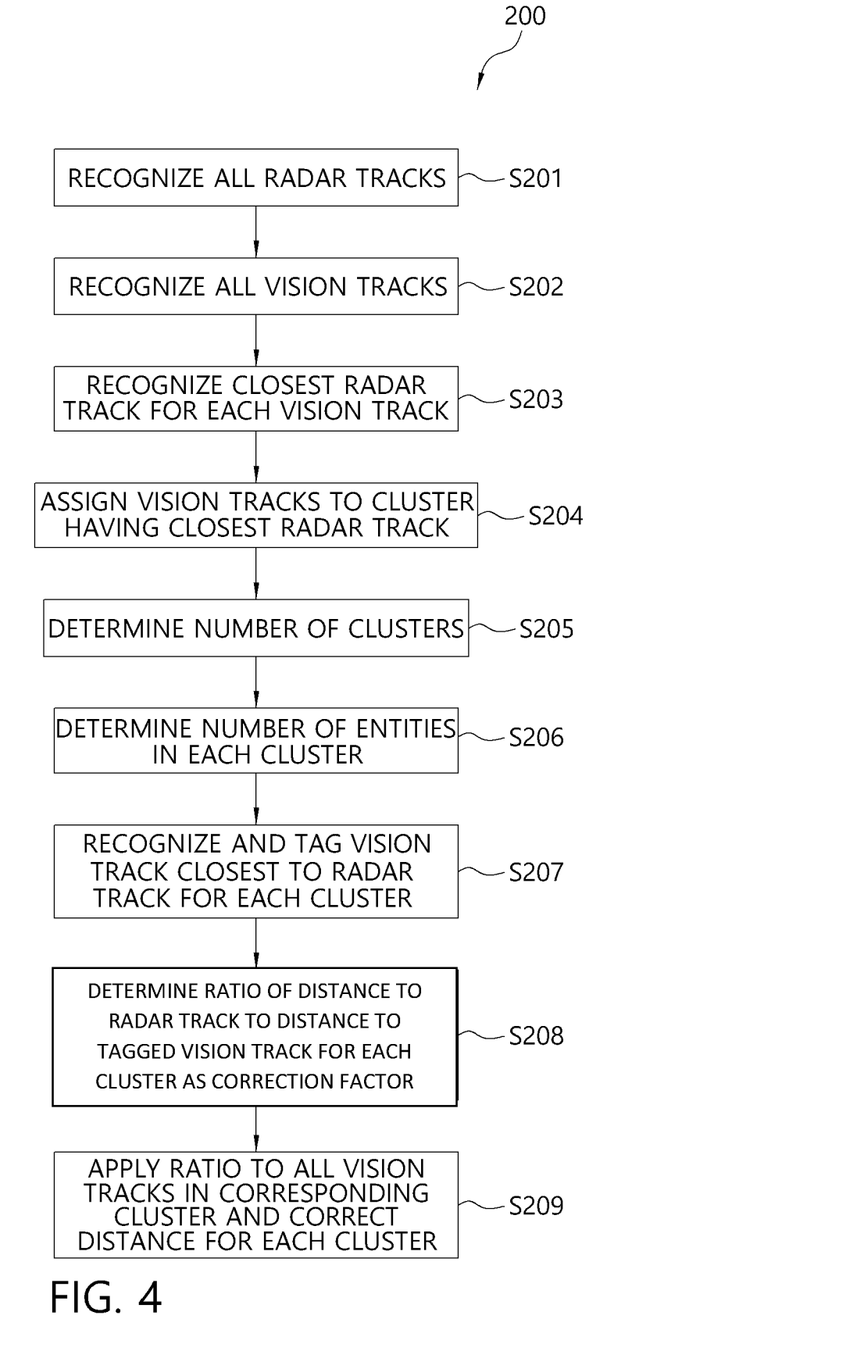
FIG. 4 is a flowchart illustrating an object detection based distance estimating method according to an embodiment of the present disclosure.

Hereinafter, an object detection based distance estimating method according to an embodiment of the present disclosure will be described with reference to FIGS. 4 to 11. FIG. 4 is a flowchart illustrating the object detection based distance estimating method according to the embodiment of the present disclosure.

An object detection based distance estimating method 200 includes recognizing radar tracks and vision tracks (S201 and S202), assigning the vision tracks to a cluster (S203 to S206), and determining a correction factor and correcting distances (S207 to S209).

In more detail, as shown in FIG. 4, first, a controller 110 recognizes all the radar tracks corresponding to distances detected by a first sensor 11 based on data detected by a fusion sensor 120 (S201). Here, when a plurality of pedestrians move in groups as shown in FIG. 2, the first sensor 11 may detect a distance to each group by the closest portion of each group to a vehicle.

Figure 5:
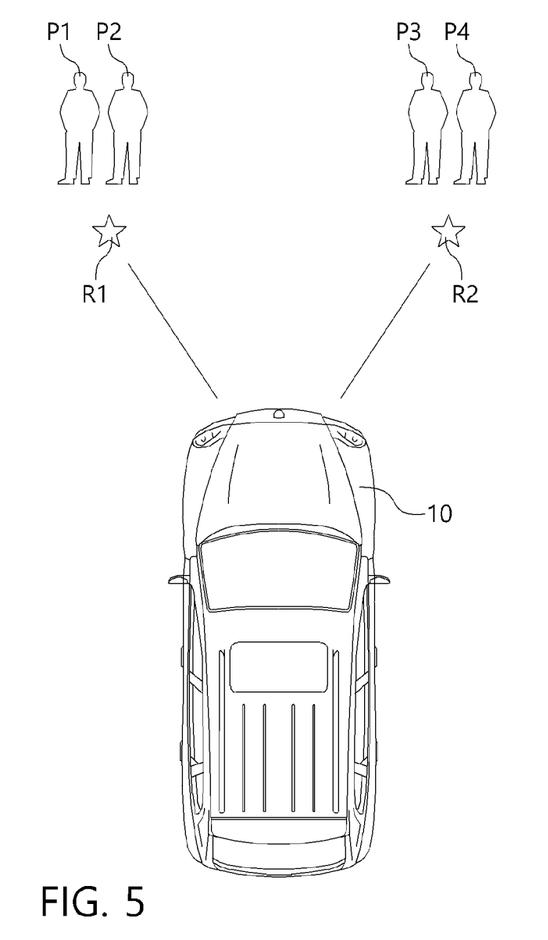
FIG. 5 is a view illustrating an example of recognizing radar tracks in FIG. 4.

FIG. 5 is a view illustrating an example of recognizing the radar tracks in FIG. 4.

Referring to FIG. 5, when a pedestrian P1 and a pedestrian P2 move in group, and a pedestrian P3 and a pedestrian P4 move in group, distances measured by the first sensor 11 may be represented by a radar track R1 and a radar track R2, respectively.

That is, the distance from a vehicle 10 to the group of the pedestrian P1 and the pedestrian P2 may be represented by the radar track R1. Likewise, the distance from the vehicle 10 to the group of the pedestrian P3 and the pedestrian P4 may be represented by the radar track R2.

Similarly, the controller 110 recognizes all the vision tracks corresponding to distances detected by a second sensor 12 (S202). Here, the vision track may be recognized through images obtained by the second sensor 12.

Figure 6:
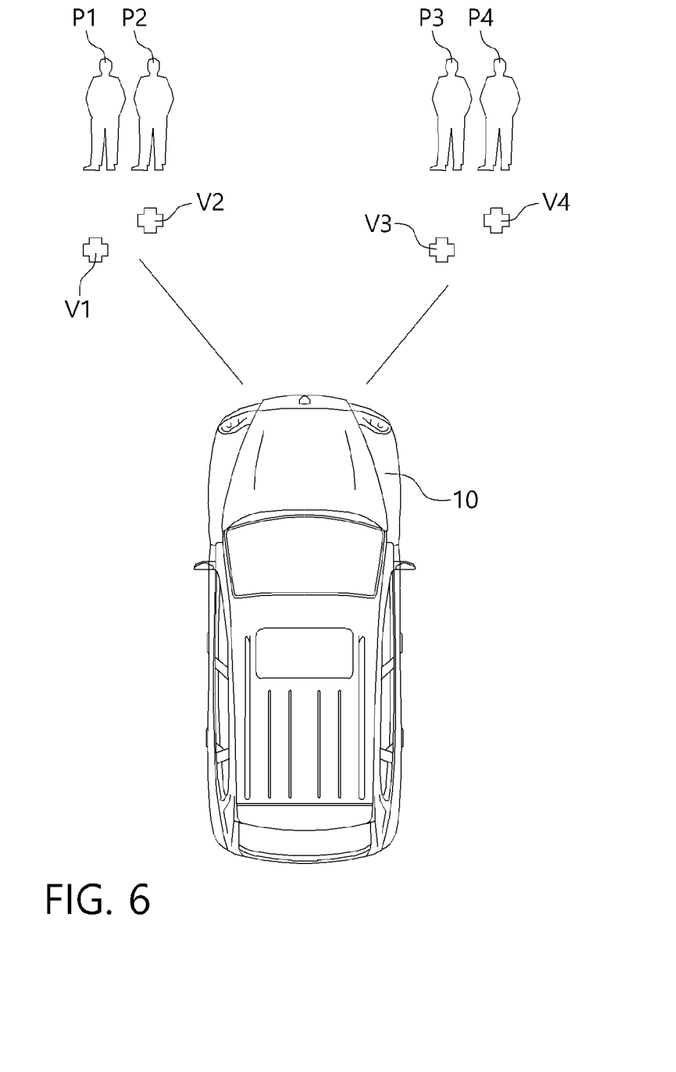
FIG. 6 is a view illustrating an example of recognizing vision tracks in FIG. 4.

FIG. 6 is a view illustrating an example of recognizing the vision tracks in FIG. 4.

Referring to FIG. 6, the distances measured from the vehicle 10 for each of the pedestrian P1 to the pedestrian P4 may be represented by a vision track V1 to a vision track V4. Here, the pedestrian P1 and the pedestrian P2, and the pedestrian P3 and the pedestrian P4 may be positioned not to be the same with respect to the vehicle 10.

For example, the pedestrian P1 may be closer to the vehicle 10 than the pedestrian P2, but the present disclosure is not limited thereto, and the pedestrian P2 may be closer to the vehicle 10 than the pedestrian P1. Likewise, the pedestrian P3 may be closer to the vehicle 10 than the pedestrian P4, but the present disclosure is not limited thereto, and the pedestrian P4 may be closer to the vehicle 10 than the pedestrian P3. That is, the pedestrian P1 to the pedestrian P4 may be positioned at substantially different distances from the vehicle 10.

Next, the controller 110 recognizes the closest radar track to each vision track (S203). This is to distinguish the pedestrian who exists at a position actually close to the vehicle as the distance measured by the first sensor 11 is substantially more accurate than the distance measured by the second sensor 12 for a longitudinal distance from the vehicle 10.

Figure 7:
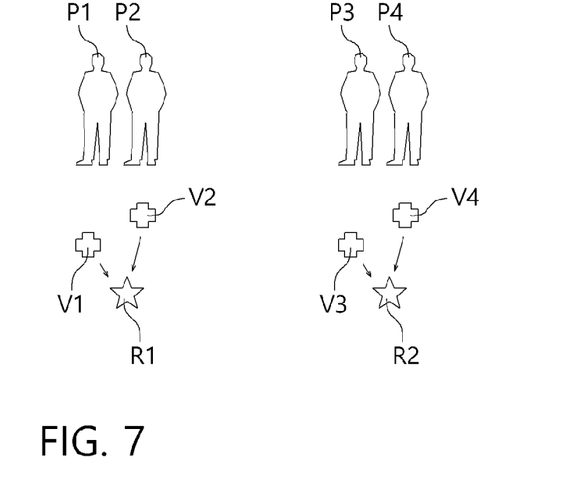
FIG. 7 is a view illustrating an example of recognizing a vision track closest to the radar track in FIG. 4.

FIG. 7 is a view illustrating an example of recognizing the vision track closest to the radar track in FIG. 4.

Referring to FIG. 7, the vision track V1 and the vision track V2 may be closest to the radar track R1 among the radar tracks, and the vision track V3 and the vision track V4 may be closest to the radar track R2 among the radar tracks.

Next, the controller 110 assigns each vision track to a cluster having the radar track closest to each vision track. Thus, a group of pedestrians may be assigned to one cluster.

Figure 8:
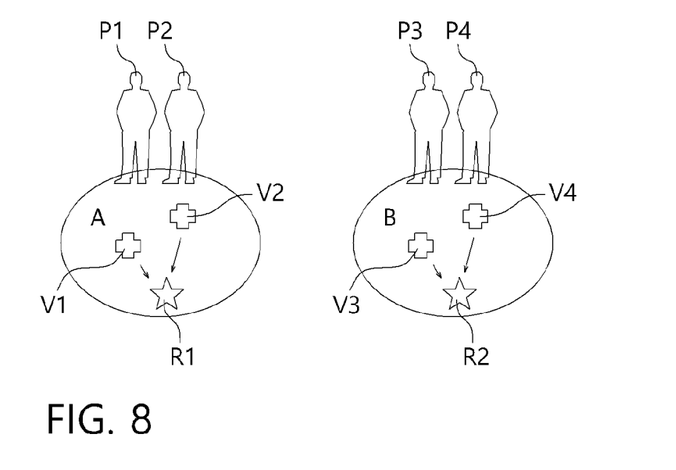
FIG. 8 is a view illustrating an example of assigning the vision track in FIG. 4.

FIG. 8 is a view illustrating an example of assigning the vision track in FIG. 4.

Referring to FIG. 8, with the radar track R1 as a reference, the adjacent vision tracks V1 and V2 may be assigned to one cluster A. Similarly, with the radar track R2 as a reference, the adjacent vision tracks V3 and V4 may be assigned to one cluster B.

As described above, the controller 110 may recognize the group of the pedestrians, each of which composed of a plurality of pedestrians, by assigning the adjacent vision tracks for each radar track to one cluster.

The controller 110 may determine the number of clusters and the number of entities to repeat calculations for each of entities representing objects for each cluster.

Specifically, the controller 110 determines the number of clusters (S205). That is, the number of clusters to which the vision tracks adjacent to each radar track are assigned may be determined for each radar track.

In FIG. 8, there are the cluster A including the vision track V1, the vision track V2, and the radar track R1, and the cluster B including the vision track V3, the vision track V4, and the radar track R2. In this case, the number of clusters is two.

Next, the controller 110 determines the number of entities representing the objects in each cluster (S206). Here, the object existing in each cluster may be the pedestrian, which may correspond to the vision track. Thus, the number of entities may be the number of vision tracks included in the corresponding cluster.

In FIG. 8, the cluster A may include two entities such as the vision track V1 and the vision track V2. The cluster B may include two entities such as the vision track V3 and the vision track V4.

Next, the controller 110 recognizes and tags the closest vision track from the radar track for each cluster (S207).

Figure 9:
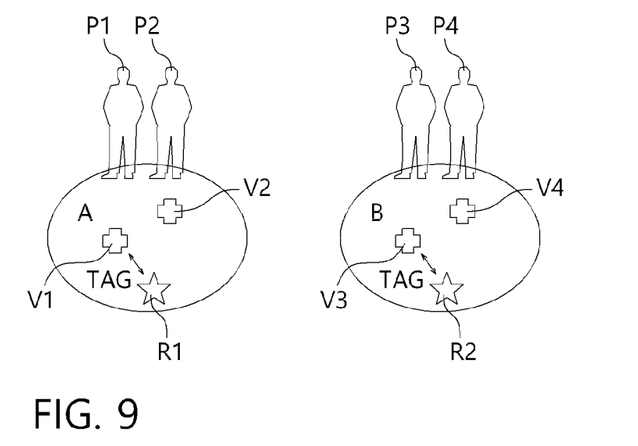
FIG. 9 is a view illustrating an example of tagging in FIG. 4.

FIG. 9 is a view illustrating an example of tagging in FIG. 4.

Referring to FIG. 9 as an example, in the cluster A, a distance between the vision track V1 and the radar track R1 may be shorter than a distance between the vision track V2 and the radar track R1. That is, the vision track V1 may be closest to the radar track R1. Thus, a tag may be added to the vision track V1 for the cluster A.

Likewise, in the cluster B, a distance between the vision track V3 and the radar track R2 may be shorter than a distance between the vision track V4 and the radar track R2. That is, the vision track V3 may be closest to the radar track R2. Thus, a tag may be added to the vision track V3 for the cluster B.

Next, the controller 110 determines a ratio of the distance from a vehicle 10 to the radar track to a distance from the vehicle 10 to the closest vision track (S208). The ratio determined here may be a correction factor CF for correcting the distance of the vision track.

Figure 10:
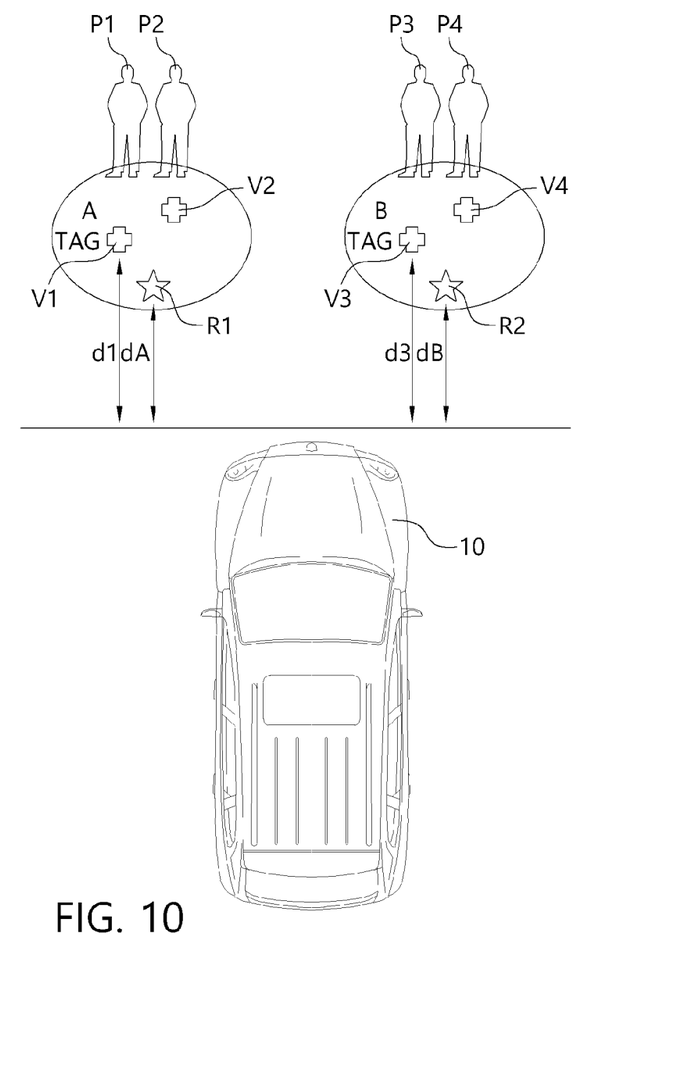
FIG. 10 is a view illustrating an example of determining a correction factor in FIG. 4.

FIG. 10 is a view illustrating an example of determining the correction factor in FIG. 4.

Referring to FIG. 10, the distances corresponding to the vision tracks V1 to V4 and the radar tracks R1 and R2 may be represented with reference to a front bumper of the vehicle 10. Here, the correction factor CF for each cluster may be determined according to the following equations, $$CF1 = dA/d1$$

$$CF2 = dB/d3$$

wherein CF1 is a correction factor for cluster A, CF2 is a correction factor for cluster B, dA is the distance from the vehicle 10 to the radar track R1, d1 is the distance from the vehicle 10 to the tagged vision track V1, dB is the distance from the vehicle 10 to the radar track R2, and d3 is the distance from the vehicle 10 to the tagged vision track V3.

Next, the controller 110 applies the ratio determined as the correction factor for each cluster to all the vision tracks assigned to the corresponding cluster (S209). That is, the distance between the vehicle 10 and the pedestrian may be accurately estimated by correcting the distance of the vision track corresponding to the pedestrian.

Figure 11:
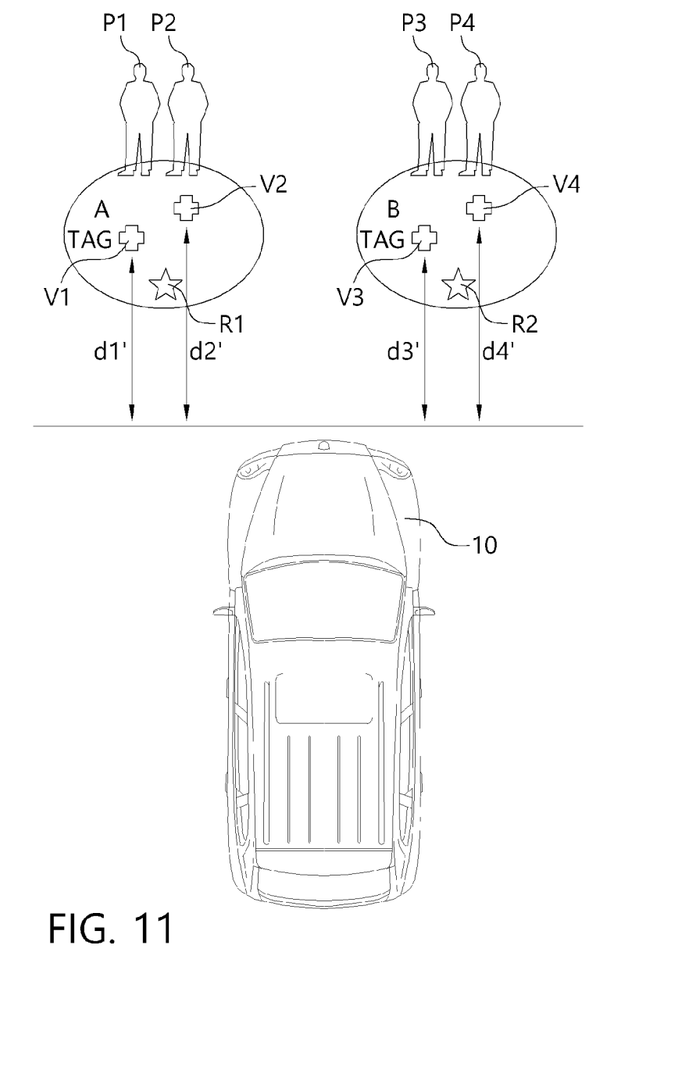
FIG. 11 is a view illustrating an example of correcting distances in FIG. 4.

FIG. 11 is a view illustrating an example of correcting the distances in FIG. 4.

Referring to FIG. 11, the distances from each pedestrian to the vehicle 10 may be corrected by the correction factor CF. Here, the distances to each vision track may be corrected according to the following equations, $$d1' = CF1 \times d1$$

$$d2' = CF1 \times d2$$

$$d3' = CF2 \times d3$$

$$d4' = CF2 \times d4$$

wherein d1 to d4 are the distances from the vehicle 10 to the respective vision tracks V1 to V4, and d1' to d4' are corrected distances from the vehicle 10 to the respective vision tracks V1 to V4.

As may be seen from the above equations, the distance of the vision track closest to the radar track among the vision tracks is replaced by the distance of the corresponding radar track, which is more accurate, and based on this, each vision track may be corrected.

As described above, the controller 110 may estimate an accurate distance for each pedestrian by correcting the distances of all the vision tracks assigned to the corresponding cluster based on the closest vision track from the radar track for each cluster.

Since the present disclosure may accurately estimate the distances using such methods, the present disclosure may accurately predict the time until the vehicle collides with the pedestrian.

The above-described methods may be implemented by the object detection based distance estimating device 100 as shown in FIG. 1, and particularly, may be implemented as software programs that perform the above-described operations. In this case, such programs may be stored in a computer-readable recording medium or transmitted through a transmission medium or communication networks by a computer data signal combined with a carrier.

Here, the computer-readable recording medium includes all types of recording devices in which data readable by a computer system is stored, such as a read-only memory (ROM), a random access memory (RAM), a compact disc read-only memory (CD-ROM), a digital versatile disc-audio (DVD-A) floppy disk, a hard disk, an optical data storage device, or the like.

An object detection based distance estimating device and a method thereof according to one embodiment of the present disclosure can accurately estimate distances by correcting distances obtained by a fusion sensor using a ratio of obtained distances according to situations, thereby accurately predicting the time until a vehicle collides with a pedestrian.

The embodiments of the present disclosure have been described above. However, it should be noted that the spirit of the present disclosure is not limited to the embodiments in the specification and those skilled in the art and understanding the present disclosure may easily suggest other embodiments by addition, modification, and removal of the components within the same spirit, but those are construed as being included in the spirit of the present disclosure.

What is claimed is:

1. A device for estimating a distance based on object detection, the device comprising:
   a fusion sensor including a first sensor configured to detect positions of a plurality of objects in front of a host vehicle and a second sensor configured to capture a front image of the host vehicle; and
   a controller communicatively connected to the fusion sensor and configured to:
   recognize radar tracks corresponding to distances detected by the first sensor and vision tracks corresponding to distances detected by the second sensor,
   assign, among all of the recognized vision tracks, adjacent vision tracks to each of the radar tracks to one cluster, and
   update the distance of each of the vision tracks assigned to the corresponding cluster based on the closest vision track from the corresponding radar track for each cluster by multiplying a correction factor to the distance of each of the vision tracks assigned to the corresponding cluster,
wherein the correction factor for each cluster is a ratio of a distance from the host vehicle to the corresponding radar track to a distance from the host vehicle to the closest vision track of the corresponding cluster.

2. The device of claim 1, wherein the first sensor is a radar sensor or a lidar sensor, and the second sensor is an image sensor.

3. The device of claim 1, wherein the controller is configured to recognize the closest radar track for each of the vision tracks and assign each vision track to the corresponding cluster having the closest radar track.

4. The device of claim 1, wherein the controller is configured to:
recognize and tag the closest vision track from the radar track for each cluster,
determine the ratio of the distance from the host vehicle to the radar track to the distance from the host vehicle to the tagged vision track for each cluster, and
multiply the ratio to the distance of each of the vision tracks assigned to the corresponding cluster.

5. The device of claim 4, wherein the controller is configured to determine the number of the clusters and determine the number of objects in each cluster.

6. A method of estimating a distance based on object detection, the method comprising:
detecting, by a first sensor, positions of a plurality of objects in front of a host vehicle;
capturing, by a second sensor, a front image of the host vehicle;
recognizing, by a controller, radar tracks corresponding to distances detected by the first sensor and vision tracks corresponding to distances detected by the second sensor based on data detected by a fusion sensor including the first sensor and the second sensor;
assigning, by the controller, among all of the recognized vision tracks, adjacent vision tracks to each of the radar tracks to one cluster, the controller being communicatively connected to the fusion sensor; and
updating, by the controller, the distance of each of the vision tracks assigned to the corresponding cluster based on the closest vision track from the corresponding radar track for each cluster, by multiplying a correction factor to the distance of each of the vision tracks assigned to the corresponding cluster, wherein the correction factor for each cluster is a ratio of a distance from the host vehicle to the corresponding radar track to a distance from the host vehicle to the closest vision track of the corresponding cluster; and
predicting, by the controller, a time until the host vehicle collides with each object based on the updated distances.

7. The method of claim 6, wherein the first sensor is a radar sensor or a lidar sensor, and the second sensor is an image sensor.

8. The method of claim 6, wherein the assigning operation includes recognizing the closest radar track for each of the vision tracks and assigning each vision track to the corresponding cluster having the closest radar track.

9. The method of claim 6, wherein the updating operation includes:
recognizing and tagging the closest vision track from the radar track for each cluster;
determining the ratio of the distance from the host vehicle to the radar track to the distance from the host vehicle to the tagged vision track; and
multiplying the ratio to the distance of each of the vision tracks assigned to the corresponding cluster.

10. The method of claim 6, further comprising:
after the assigning the adjacent vision tracks, determining, by the controller, the number of the clusters; and
determining, by the controller, the number of objects in each cluster.

11. A vehicle comprising:
a fusion sensor including a first sensor configured to detect positions of a plurality of objects in front of a host vehicle and a second sensor configured to capture a front image of the host vehicle; and
a controller communicatively connected to the fusion sensor and configured to:
recognize radar tracks corresponding to distances detected by the first sensor and vision tracks corresponding to distances detected by the second sensor,
assign, among all of the recognized vision tracks, adjacent vision tracks to each of the radar tracks to one cluster, and
update the distance of each of the vision tracks assigned to the corresponding cluster based on the closest vision track from the corresponding radar track for each cluster by multiplying a correction factor to the distance of each of the vision tracks assigned to the corresponding cluster,
wherein the correction factor for each cluster is a ratio of a distance from the host vehicle to the corresponding radar track to a distance from the host vehicle to the closest vision track of the corresponding cluster.

12. The vehicle of claim 11, wherein the first sensor is a radar sensor or a lidar sensor, and the second sensor is an image sensor.

13. The vehicle of claim 11, wherein the controller is configured to recognize the closest radar track for each of the vision tracks and assign each vision track to the corresponding cluster having the closest radar track.

14. The vehicle of claim 11, wherein the controller is configured to:
recognize and tag the closest vision track from the radar track for each cluster,
determine the ratio of the distance from the host vehicle to the radar track to the distance from the host vehicle to the tagged vision track for each cluster, and
multiply the ratio to the distance of each of the vision tracks assigned to the corresponding cluster.

15. The vehicle of claim 14, wherein the controller is configured to determine the number of the clusters and determine the number of objects in each cluster.

* * * * *